United States Patent [19]

Bridgeford

[11] Patent Number: 4,713,135
[45] Date of Patent: Dec. 15, 1987

[54] PROCESS FOR SEAMING COATED CELLULOSE WEBS

[75] Inventor: Douglas J. Bridgeford, Champaign, Ill.

[73] Assignee: Teepak, Inc., Oak Brook, Ill.

[21] Appl. No.: 774,108

[22] Filed: Sep. 9, 1985

[51] Int. Cl.⁴ .......................... B29C 53/00; C09J 5/02
[52] U.S. Cl. ...................................... 156/218; 53/469;
138/118.1; 156/83; 156/182; 156/203;
156/308.6; 156/319; 156/325; 426/138;
426/140; 493/269
[58] Field of Search ................. 156/83, 319, 218, 325,
156/308.6, 182, 203; 53/469; 426/138, 140;
138/118.1; 493/269

[56] References Cited

U.S. PATENT DOCUMENTS

| | | | |
|---|---|---|---|
| 2,330,446 | 9/1943 | Piazze et al. | 93/18 |
| 2,952,550 | 9/1960 | Parlour | 156/218 |
| 3,005,728 | 10/1956 | Bridgeford | 117/118 |

*Primary Examiner*—John J. Gallagher
*Attorney, Agent, or Firm*—William J. Crossetta; Michael L. Dunn

[57] ABSTRACT

A method for seaming flexible cellulose webs, to form a flexible cellulosic laminate structure, by a process which comprises overlapping edges of said cellulosic web, applying therebetween an aqueous zinc chloride solution, heating and pressing together the overlapped edges and retaining at least about 0.002 g/cm² or more zinc chloride at the seam of said web and the resulting seamed webs.

24 Claims, No Drawings

PROCESS FOR SEAMING COATED CELLULOSE WEBS

BACKGROUND OF THE INVENTION

1. Field of the Invention

This invention relates to a means for joining or seaming structurally composite cellulose containing materials, and is particularly applicable to structurally composite, fibrous containing cellulosic materials which have been regenerated from viscose. The invention has broad application to multiple structural forms of cellulose containing material including tubes, sheets, pieces, and webs but has primary utility in the formation of artificial sausage casing.

2. Prior Art

The manufacture of artificial tubular casings from regenerated cellulose has been practiced for many years, particularly for use in the processing of frankfurters and related sausage products such as bologna, ham, and the like. The process essentially comprises extruding regenerated cellulose in a tube in the form of nonfibrous reinforced or forming a fibrous web of material into a tube and extruding viscose about the exterior and interior of the tube formed web; coagulating and regenerating the viscose to form a cellulosic tube; washing, plasticizing, and drying to form the completed tube. Though the process is well known and widely practiced, the equipment is complex and the problems associated with the process are numerous. A particular problem is the formation of gaseous byproducts during the viscose regeneration step which require means for venting the formed tube and may even require the purposeful cutting of the formed tube to prevent damage from the entrapped gases. Another problem is the formation of a composite structure by treatment of the completed tube with various functional coatings, on either or both of the exterior or interior of the tube, that may be required in the final product. By composite structure is meant cellulosic material containing one or more functional coatings on either or both sides. By functional coating is meant a coating, continuous or discontinuous at the interior and/or exterior surface of the tubing, of a composition which acts to modify the mechanical, biological and/or chemical characteristics of the cellulosic tubing surface.

The application of functional coatings to form structurally composite materials has always presented a problem in the conventional method of forming cellulose tubing, particularly coatings contained on the interior of the tube. Typically, an interior coating is applied by breaching the integrity of a coagulated and regenerated tube and inserting into the breached tube a "slug" of liquid coating material. If the slug is maintained at a low point, through which the tube is continuously processed, the liquid slug will continuously contact the interior wall thereof. Use of a slug, however, has many problems in that it is difficult to control the amount and consistency of functional coatings being applied and requires cutting the tube and interrupting the continuous manufacture of the tubing for replenishing the slug or correcting other multiple problems that might occur. In such method, the manufacturer is at the mercy of the physical characteristics of the liquid slug itself and has very limited means to mechanically control the thickness, amount, continuity, or even consistency of the applied coating. Another method of coating the interior of tubing is to treat the exterior of the completed tubing and evert the tubing to gain placement of the exterior coating on the interior surface. Everting processes provide an advantage in that the amount and thickness of the coating can be mechanically controlled, but the delicacy of coating the exterior of an inflated tube and the stress problems associated with turning inside out a coated tube represent significant barriers to commercial acceptability. Such process also requires complex machinery and cannot be performed on a continuous tube. Thus, the application of functional coatings, particularly interior coatings, in the conventional manufacture of cellulosic tubing has fostered a complex and costly industry in and of itself.

In order to avoid at least some of the cost and complexities of the existing conventional method of forming composite cellulose tubing, it has been thought to be desirable to manufacture flat webs of cellulose material to their completed form, which can be provided with functional coatings or otherwise treated, and, thereafter form the desired tubing by longitudinally seaming the web. Though the longitudinal seaming of webs of cellulose containing material has been the subject of many patents and other publications, no seaming means has heretofore been found which prepares a seam good enough to enjoy wide commercial use in the manufacture of regenerated cellulose sausage casings. Inevitably, each of the prior art attempts at seaming a tubular casing has resulted in a variety of problems, such as the weakening of the casing at the seam or points adjacent to the seam, weakening of the seam by application of functional coatings, web distortion caused by the seaming process, duplication of processing steps, or other problems associated with the formation or presence of a seam.

Typically, in prior art means of seaming cellulose webs, the presence of a functional coating at the point of seaming adds to the seaming problem, causing further difficult to detect seam strength and adherence defects. Invariably, subjecting the resulting tube to smoke house conditions, stuffing, soaking or rewetting the casing in accord with common commercial practice, results in exaggerated weaknesses at the casing seam or adjacent points which in turn causes failures or distortions of the stuffed casing. Thus, a real need exists for an inexpensive and speedy process for the seaming of flexible casing material.

U.S. Pat. No. 2,952,550 proposes a method of seaming fibrous reinforced cellulose structures by the application of various specific adhesives to overlapped edges of a sheet or web, which does not contain a functional coating but otherwise is a completely processed, regenerated cellulose fibrous material. Amongst the multiple adhesives disclosed in the patent, Example XI describes the formation of the completed tube by sealing uncoated commercial fibrous casing lengthwise, utilizing a thermoplastic material sealing apparatus, by applying a 75% aqueous solution of zinc chloride between the overlapped edges of the casing, pressing together the overlapped seam and substantially immediately washing the seamed tube by passing it through a water bath to wash out the zinc chloride. The washing step is described as a critical step in the process, necessary to remove the highly acidic zinc chloride solution which otherwise is seen to act quickly on the uncoated cellulosic material of the example to degrade and weaken it. The thus washed, seamed, fibrous reinforced tubing then requires further plasticizing and drying in accord with the process of forming regenerated cellulose to provide an adequate completed product.

Such sealing process, as described in U.S. Pat. No. 2,952,550, is very costly because of the necessary repetition of washing, plasticizing, and drying steps. It does not solve the problem of applying a functional coating and cannot be used on unreinforced cellulosic material. The thermoplastic sealing apparatus utilized in the patent heats the seal to such high temperature (>150° C.), to cause fusion in accord with thermoplastic material processing as recommended by U.S. Pat. No. 2,330,446, that even fibrous reinforced cellulose webs become weakened and burst in areas adjacent to the seam. Further, the required substantially immediate imposition of a washing step removing the zinc chloride before the seam is cured, adversely affects the dried casing by significantly reducing its stretchability and necessitates additional plasticizing and drying steps, which significantly increases the cost inherent therewith. Even with the incorporation of these additional steps, the resulting completed tubing product displays uneven characteristic at the seam in comparison to the remainder of the casing. Such process, as proposed in U.S. Pat. No. 2,952,550, is obviously seriously inadequate for commercial utility and as far as it is known has never been commercially implemented.

SUMMARY OF THE INVENTION

In accordance with the present invention a low cost method of seaming cellulose webs having improved physical properties is provided.

I have found that when a cellulose web is overlapped and sealed with at least about 0.002 g of zinc chloride per square centimeter of overlapped seam, at reduced sealing temperatures of from about 0° to about 125° C., the overlapped seam pressed together and the seam is allowed to cure by retaining the zinc chloride content at the overlapped seam to a level of at least about 0.002 g/cm$^2$, a superior seamed casing results which requires no further washing, plasticizing, and drying and has a long shelf life, a strong seam and mechanical characteristics so close to the original web as to show no significant difference. Prior application of an appropriate thin layer functional coating to one or more of the surfaces to be overlapped forming a structurally composite cellulosic web does not significantly affect the seam. Such seamed casing can be produced at a significant cost reduction from that of the closest prior art in that there is a significant reduction in processing steps, energy costs, and plasticizer costs as well as an increase in speed of processing.

DETAILED DESCRIPTION OF THE INVENTION

In accord with the invention a regenerated cellulose tubular structure, suitable for stuffing to form a sausage and requiring no further plasticizing, washing, and drying, is formed by an improved method comprising forming a flat web of non-reinforced or fibrous reinforced cellulose containing material, optionally applying to said cellulose containing web an appropriate thin functional coating, applying between overlapped edges of said web at least about 0.002 g of zinc chloride per square centimeter of lapped seam, sealing said overlapped edges, at a temperature of from about 0° to less than about 125° C., by pressing together said overlapped edges and retaining at least about 0.002 g/cm$^2$ or more of the zinc chloride content at said lapped seam until said casing is stuffed.

Surprisingly, cellulose tubing formed by this improved process has been found to have a seam strength approaching the strength of the web material itself and web material adjacent the seam is not degraded or adversely affected thereby. The presence of various thin functional coatings appear to have no significant adverse effect upon the strength of the seam. Composite cellulose tubing manufactured by this method can be produced with more accurately controlled interior coatings thereon than was possible in the prior art.

The option that a thin functional coating be present and the zinc chloride content be retained in the completed tubing has resulted in multiple benefits. The presence of the zinc chloride, commingled with the functional coating particles, appears to allow more complete curing of the seam and results in a maintaining of seam strength during the shelf life while providing added zinc content to the final food product, an appropriate mineral to daily human food requirements. As methods for removing zinc chloride typically involve aqueous washing of the seamed tubing, retention of the zinc chloride also avoids the added costs of replasticizing and redrying the tubing as well as avoiding the loss of dimensional determination caused by repeated wetting and redrying.

The cellulose web envisioned in accord with the invention can be comprised of a broad range of cellulose containing materials including cellulose, regenerated cellulose or various of the cellulose derivatives and may also contain various non-woven or woven fibers of materials such as sisal, flax, bagasse, hemp, cotton or various of the artificial polymeric compounds. Typically, a non-fibrous cellulosic web is formed by extruding the cellulose containing material in the form of a tube, while a fibrous reinforced cellulose web is comprised of a web or paper of high porosity, containing added fibers such as hemp fibers, all of which are coated with a light coating of regenerated viscose. The coated and saturated fibers or non-fibrous containing extruded material, in the form of a wet gel web, are thereafter treated similarly, being typically washed and then plasticized by passing through a water bath containing a plasticizer such as glycerin or a food acceptable glycol such as propylene glycol or Diglycerol O/B. The washed and plasticized wet gel web is then dried to remove a substantial portion of the water to produce the completed flat web of reinforced or non-reinforced cellulose starting material of the instant process. Generally, by the term dried is meant that the web is dried to a moisture content of from about 2% to about 30% and preferably from about 5% to about 20%. Generally it is also preferred that the dried cellulosic web have a pH from about 7 to about 9. Such cellulose structures are well known in the art of sausage casings and are generally referred to as regenerated cellulose sausage casings (webs).

The term "functional coating" as envisioned in accord with the invention is used in this application to mean a coating, continuous or discontinuous, which is applied at least in part on at least one surface to be overlapped of the cellulosic web and which is not completely removed prior to seaming in accord with the process of the invention. Multiple functional coatings of the prior art are envisioned as being appropriate in accord with the process of the invention provided that they are thin coatings and do not cancel the seaming effect of the $ZnCl_2$. It is preferred that thickness of the functional coatings be maintained on each overlapping surface of the seam at less than about 5.0 microns and more preferably less than about 4 microns. Generally, it is preferred to apply a functional coating having a pH from about 3.0 to about 12.5 to the dried cellulosic composite web. Amongst the various appropriate functional coatings which have been found operable with the process of the invention are those coatings which lubricate, act as release coatings, transfer smoke, transfer color, prevent blocking, are anti-bacterial, antimicotic, form a barrier, provide gloss, increase adhesion and the like. Examples of appropriate functional coatings include long chain alkyl ketene dimers, polyamide-epichlorohydrin polymers, gelatin, carboxy methyl cellulose, alkyl carboxylic acid chrome complexes, polyurethanes, polyureas, silicones, polyoxyethylene ether surfactants, polyethylene imine, melomineformaldehyde resins, polyester latex, smoke tars, pigment and dye particles and the like.

Though I wish not to be bound by the following, I, believe that the mechanism of seaming is such that the aqueous component of the zinc chloride solution acts to swell the cellulosic web material, while the zinc chloride acts as a catalyst in breaking the hydrogen to oxygen bonds of the cellulose molecules. The application of moderate heat and pressure in accord with the invention acts to mechanically deform the swelled overlapping cellulose layers while also enhancing the chemical interaction of the zinc chloride component with the cellulose and/or the plasticizer to form a chemical bond. The result is an interdiffusion of the overlapping cellulose layers in a combination chemical and mechanical bond having approximately as great a strength as the intermolecular cellulosic bond of the film itself. If the zinc chloride component is substantially immediately removed by washing in accord with the process of U.S. Pat. No. 2,952,550, the seam is not adequately cured and the chemical bond is modified thus leaving the mechanical bond to primarily maintain the seam. The mechanical bond is further weakened by the additional swelling caused by such washing and the presence of interstitial spaces which result from the evacuation of the zinc chloride and loosened functional coating particles.

The effect of the presence of the functional coating can be dependent upon the continuity of the coating on the cellulosic web. Typically, functional coatings are somewhat discontinuous, so that what appears to the naked eye as a continuous coating is seen under the microscope as a mottled or otherwise discontinuous coating wherein there are significant number of random bare spots or sections between the coated areas. Typically also, the aqueous zinc chloride solution is highly acidic when applied to the web and will act upon continuous thin functional coatings of less than about 5.0 microns in thickness in such manner as to further loosen such coatings and create further voids therein. Typically, loose particulate matter of the functional coating, together with the plasticizer and zinc chloride, and the mechanical deformation of the cellulosic material all act together to create interdiffusion of the plasticizer, zinc chloride and particulate functional material between the two cellulose layers. Subsequent immediate washing of such seam interrupts the curing of the seam and results in the removal of at least some of the interdiffused material and further weakens the mechanical bond. It is significant to note that the pH of the zinc chloride, upon contact with the thin functionally coated cellulose, surprisingly almost immediately moves toward neutrality thus representing no continuous threat to the acid degradation of the cellulosic web.

Aqueous zinc chloride solutions of various concentration are operable in the invention. Generally, the aqueous solution should comprise at least about 60% zinc chloride by weight. Such solutions are typically very acidic but, as before described, are affected by the functional coating or cellulose material such that when contacted therewith the pH of the treated seam rapidly moves toward neutrality. The presence of free acid in variations of the commercial grades of zinc chloride may be found undesirable in which event it may be removed by the addition of sufficient metallic zinc to react with the excess acid.

The amount of aqueous zinc chloride solution added to the seam can vary widely. Generally I have found that for functional coatings of less than about 5 microns, a concentration of aqueous zinc chloride solution of about 60% or more is preferred to provide about 0.002 g of zinc chloride/$cm^2$ of overlap material, the minimum amount necessary to obtain adequate curing. An amount in the range from about 0.002 g/$cm^2$ to about 0.1 g/$cm^2$ is preferred and an amount in the range from about 0.004 g/$cm^2$ to about 0.02 g/$cm^2$ being especially preferred. Generally, I have also found it beneficial to allow the seam to cure at least about 30 seconds and preferably about one minute or more after sealing prior to subjecting the seam to aqueous washing in instances where the zinc chloride containing seam is washed to reduce it to minimum retention levels of the invention.

The amount of overlap of the seam can be varied significantly, but generally should not be less than about 3% of the circumference of the tube being formed. I have found that though larger overlaps can be formed, no advantage to seam strength is obtained by overlaps exceeding about 20% of the circumference of the tube being formed.

The sealing temperature must be moderate but can vary generally from about 0° C. to about 125° C. At sealing temperatures up to about 35° C., it is usually appropriate to maintain some sealing pressure on the overlapped seam after the initial contact pressure has been applied to increase seam strength. At temperatures of about 35° to about 125° C., the maintaining of continued pressure is not a significant factor. Temperatures above about 125° C. tend to cause serious degradation to the cellulosic material itself thus significantly reducing the shelf life of the completed product and in many instances causing a weakness of the web adjacent the seam which will cause bursting during the sausage stuffing process. I have found that if the casing is seamed in accord with the process at room temperature and is subsequently wound on reels in such manner as to maintain, for several minutes, at least some continued pressure on the overlapping seam, that the seam strength is increased.

The initial pressing together of the overlapping edges is essential to the obtaining of high strength seams. In this regard, I have found that an initial contact pressure of about 0.01 kg/$cm^2$ is appropriate and that such contact can be achieved by multiple means. Generally, I have found it preferable to impose an initial contact pressure between about 0.05 kg/$cm^2$ and 10 kg/$cm^2$ for efficiency of operation. A simple roller mechanism which presses together the overlapping edges has been found suitable and in some instances a heated roller which provides moderate heat to the seam in accord with the invention, together with pressure, has been found to be an ideal means for achieving both heating and initial pressure sealing of the overlapping edges. The roller surfaces may be flat or contain various designs which may or may not emboss the seam. Application of sealing pressure can be varied from the smallest fractional part of a second to serveral days.

The following examples are provided to illustrate the invention and are not intended to restrict the scope thereof. All percentages are expressed as weight percentages.

EXAMPLE I

Regenerated cellulose, fibrous reinforced and non-reinforced, tubular casing was produced by standard commercial process as described in U.S. Pat. No. 2,999,756 and 3,835,113. In producing fibrous reinforced, a high porosity web containing hemp or other fibers, was formed into a tube and the tube was passed through a viscose coating die wherein a thin coating of viscose, having a DP of about 600, was applied to both the interior and exterior surfaces thereof. The thus coated tube was immediately passed through a coagulation and regeneration bath containing a mixture of sodium sulfate and sulfuric acid to regenerate the viscose, thus forming a seamless matrix in which the reinforcing fibers of the paper web were uniformly embedded. For non-reinforced tubing, viscose was extruded in the form of a tube directly into the coagulation and regeneration bath. The resulting regenerated cellulose gel tubing was washed in a series of water baths, plasticized with a food grade glycol plasticizer to about 15% by weight plasticizer content and dried to a moisture content of about 7–13% by weight to form a completed commercial, regenerated cellulose, fiber reinforced or non-reinforced, sausage casing.

EXAMPLE II

Completed commercial regenerated cellulose, fibrous reinforced and non-reinforced, sausage casing manufactured in accord with the processes of Example I was longitudinally cut to form a flat web. An apparatus, as is commonly used for forming tubes from flat webs, was assembled comprising a circular tube forming jig which allowed forming of the flat web along its longitudinal axis into a tube with adjustable web overlap at the seam. Conventional, adjustable speed and compression, opposing rollers were mounted proximate the point of overlap of the tube jig in such manner that the overlapped web seam formed by the jig would be fed between the opposing rollers for compression. The rollers also comprised heating means which allowed variation of sealing temperature. A nozzle was arranged in such manner to permit application of a continuous coating of aqueous $ZnCl_2$ solution between the overlapping edges of the seam prior to passage of the seam between the opposing rollers. The seam overlap was adjustable to 6 or 8 mm. Samples A–W of the aforesaid flat webs, uncoated or coated with varying thicknesses and types of functional coatings were seamed at varying overlap widths, temperatures, contact pressures and $ZnCl_2$ concentration in accord with the process of the invention as set out in Table 1. Samples A–L were provided to show a direct comparison between the seaming process of U.S. Pat. No. 2,952,550 and the process of this application. Samples M–W were provided to exemplify various functional coatings and the effect of variation in the parameters of the process of this application.

Samples A–F show the effect of immediate washing as required in U.S. Pat. No. 2,952,550, occurring within 0.1 to 0.5 minutes of seaming, thus interrupting cure time and reducing the $ZnCl_2$ content to trace amounts of 0.5 parts per million. Samples G through L were provided to show the comparative effect of retaining $ZnCl_2$ content to a level approaching the lower limits of this application, e.g. 0.003 g/cm$^2$, even though the samples were washed after one minute of cure time had elapsed. Samples A–L were run under varying sealing temperature conditions falling both within the parameters of the process of this application (50° C. and 100° C.) and the high temperature utilized in U.S. Pat. No. 2,951,550 (260° C.). Where a functional coating was applied on samples A–L, it was only applied on one side of the web to allow maximum seam strength, thus overlap seaming occurred from a coated web to an uncoated web as noted by the designation c/u. The samples were coated with a 2–3 micron coating of Aquapel(TM), a functional alkyl ketene dimer coating manufactured by Hercules, containing 6% solids and used to promote release from meat stuffing. Samples M–W were provided to exemplify the variations of parameters encompassed by this application. To that end various seam widths, $ZnCl_2$ concentrations and $ZnCl_2$ retention loads (add on), contact pressure, sealing temperature, and functional coatings were applied to both fibrous reinforced and non-reinforced (designated *) cellulosic webs. Functional coatings were applied to a single side (c/u) or to both sides of the web (c/c) using the same and different coating materials such that the seam occurred from coated web to coated web or from coated web to uncoated web. When different functional coatings were seamed to each other, the identity of the functional coatings is separated by a slash (/). None of samples M–W were washed, and cure time to testing always exceeded 1.0 minutes.

TABLE I

| Sample | Overlap (mm) | $ZnCl_2$ Conc. (gm/cm$^2$) | $ZnCl_2$ Add On (gm/cm$^2$) | Contact Pressure (kg/cm$^2$) | Seal Temp. (°C.) | Cure Time (min.) | Functional Coating (ident.) | Coating Thickness (micron) | Coating Application | Residual $ZnCl_2$ (gm/cm$^2$) |
|---|---|---|---|---|---|---|---|---|---|---|
| A | 6 | 68% | 0.016 | 1.0 | 50° C. | 0.1 | — | — | | 0.5 ppm/cm$^2$ |
| B | 6 | 68% | 0.016 | 1.0 | 100° C. | 0.1 | — | — | | 0.5 ppm/cm$^2$ |
| C | 6 | 68% | 0.016 | 1.0 | 260° C. | 0.1 | — | — | | 0.5 ppm/cm$^2$ |
| D | 6 | 68% | 0.016 | 1.0 | 50° C. | 0.1 | Aquapel | 2.5 | C/U | 0.5 ppm/cm$^2$ |
| E | 6 | 68% | 0.016 | 1.0 | 100° C. | 0.1 | Aquapel | 2.5 | C/U | 0.5 ppm/cm$^2$ |
| F | 6 | 68% | 0.016 | 1.0 | 260° C. | 0.1 | Aquapel | 2.5 | C/U | 0.5 ppm/cm$^2$ |
| G | 6 | 68% | 0.016 | 1.0 | 50° C. | 1.0 | — | — | | 0.003 |
| H | 6 | 68% | 0.016 | 1.0 | 100° C. | 1.0 | — | — | | 0.003 |
| I | 6 | 68% | 0.016 | 1.0 | 260° C. | 1.0 | — | — | | 0.003 |
| J | 6 | 68% | 0.016 | 1.0 | 50° C. | 1.0 | Aquapel | 2.5 | C/U | 0.003 |
| K | 6 | 68% | 0.016 | 1.0 | 100° C. | 1.0 | Aquapel | 2.5 | C/U | 0.003 |
| L | 6 | 68% | 0.016 | 1.0 | 260° C. | 1.0 | Aquapel | 2.5 | C/U | 0.003 |
| M* | 6 | 68% | 0.04 | 0.2 | 25° C. | >1.0 | Polyurethane/ | 0.1/ | C/C | 0.04 |

TABLE I-continued

| Sample | Overlap (mm) | ZnCl$_2$ Conc. (gm/cm$^2$) | ZnCl$_2$ Add On (gm/cm$^2$) | Contact Pressure (kg/cm$^2$) | Seal Temp. (°C.) | Cure Time (min.) | Functional Coating (ident.) | Coating Thickness (micron) | Coating Application | Residual ZnCl$_2$ (gm/cm$^2$) |
|---|---|---|---|---|---|---|---|---|---|---|
| N | 6 | 68% | 0.04 | 0.2 | 25° C. | >1.0 | Polyamide Polyurethane | 0.2 0.2/0.3 | C/C | 0.04 |
| O | 6 | 70% | 0.08 | 0.62 | 70° C. | >1.0 | Ketene Dimer Surfactant Mix | 4–6/4–6 | C/C | 0.04 |
| P | 6 | 70% | 0.08 | 0.62 | 70° | >1.0 | Kymene Polyamide | 0.05 | C/U | 0.08 |
| Q | 6 | 70% | 0.08 | 0.2 | 25° C. | >1.0 | Ketene Dimer | 4/4 | C/C | 0.08 |
| R | 6 | 68% | 0.016 | 0.05 | 25° C. | >1.0 | Calcium CMC | 5 | C/U | 0.016 |
| S | 6 | 68% | 0.016 | 0.05 | 25° C. | >1.0 | Ketene Dimer/ Polyamide | 3/3 | C/C | 0.016 |
| T | 6 | 68% | 0.016 | 0.05 | 25° C. | >1.0 | Polyamide | 4 | C/U | 0.016 |
| U | 8 | 65% | 0.12 | 0.05 | 120° C. | >1.0 | Ketene Dimer | 2 | C/U | 0.12 |
| V | 8 | 65% | 0.12 | 0.05 | 120° C. | >1.0 | Stearato Chrome Complex | 2 | C/U | 0.12 |
| W | 8 | 65% | 0.12 | 0.05 | 120° C. | >1.0 | Tars from Liquid Smoke for Color | >5 | C/C | 0.12 |

*Nonreinforced

EXAMPLE III

Each of samples A–W were subjected to testing to determine the strength and quality of the seam formed.

The lap shear strength of the seam was tested on both conditioned and rewet seamed samples to approximate commercial product use.

To obtain the conditioned seamed sample, the seamed tubing was maintained in a room at 21° C. and a relative humidity of 60% until moisture equilibrium with the atmosphere was attained. The physical properties of conditioned samples give an approximation of the charcteristics such samples would have under controlled moisture conditions.

To obtain rewet seamed samples, the samples were wet in water and the shear strength of the seam tested. Rewet samples give an approximation of the characteristics such seam would have during stuffing, when used to form tubular sausage.

Lapp seam shear strength testing was done using an Instron tester wherein the cellulosic material adjacent to the seam was secured and the seam subjected to continual increasing shear.

The results of the lapp seam shear strength tests are tabulated in Table II. Therein, shear strength is presented as compared to the strength of the web adjacent to the seam or psi. Where it is compared to an adjacent web, the terminology less, equal or greater means that the shear strength of the seam was less than, equal to or greater than the strength of the cellulosic web from which the seam was prepared. The term "no seam" indicates that the seam was so weak that it fell apart with little or no urging.

In samples A–F, wherein immediate washing of the seam was instituted to remove ZnCl$_2$ to trace amounts in accord with the express direction of U.S. Pat. No. 2,952,550, the only time an adequate seam was attained was on uncoated web material which had been sealed at high temperatures (260° C.) in accord with the process of the patent. This confirms the severe limitations of the process of the patent and the increased economic cost to obtain a viable commercial product. At the lower temperature limitations of 50° C. and 100° C., with or without a functional coating, the aborted cure time, caused by an immediate wash and the removal of ZnCl$_2$, resulted in an inadequate seam having no apparent commercial utility.

In samples G–L, wherein the residual level of ZnCl$_2$ was kept within the limits of the invention even though cure time was aborted at 1.0 minutes by washing, the seam consistently proved adequate for commercial use. It should be noted that though the seam held at a 260° C. seal temperature in samples G and L that there was significant degradation of the cellulose material adjacent to the seam which acted to reduce the shelf life and thus the commercial utility of the product.

In samples M–W, the seam was not washed and substantially all the ZnCL$_2$ which was initially added on was retained. Cure times were all greater than 1.0 minutes and samples were tested both rewetted and conditioned as well as with multiple variable functional coatings. The tabulated results show that the seams formed were consistently equal to or exceeding commercial needs.

TABLE II

| | Lap Shear Strength | |
|---|---|---|
| Sample | Conditioned (Dry) | Rewet |
| A | no seam | no seam |
| B | no seam | no seam |
| C | greater | greater |
| D | no seam | no seam |
| E | no seam | no seam |
| F | no seam | no seam |
| G | equal/greater | equal/greater |
| H | equal/greater | equal/greater |
| I | equal/greater | equal/greater |
| J | equal/greater | equal/greater |
| K | equal/greater | equal/greater |
| L | equal/greater | equal/greater |
| M | greater | greater |
| N | greater | greater |
| O | no seam | no seam |
| P | equal | equal |
| Q | equal | equal |
| R | 3110 psi | greater |
| S | 3620 psi | equal/greater |
| T | 3044 psi | equal/greater |
| U | 3233 psi | equal/greater |
| V | 2800 psi | equal/greater |
| W | 2612 psi | equal/greater |

What is claimed is:

1. In a process for producing a cellulosic tubular structure suitable for stuffing to form a sausage wherein the longitudinal edges of a web of cellulose containing material are overlapped to form a tube and sealed by applying an aqueous zinc chloride solution between said overlapped edges, the improvement comprising applying at least about 0.002 g of zinc chloride per $cm^2$ of lapped seam between said overlapped edges, sealing said overlapping edges, at a temperature of from about 0° C. to about 125° C., by pressing together said overlapped edges having aqueous zinc chloride solution between and retaining at least 0.002 $g/cm^2$ of zinc chloride at said overlapped seam of said casing.

2. The process of claim 1 wherein the seam is allowed to cure at least about 30 seconds after sealing prior to subjecting the seam to aqueous washing.

3. The process of claim 1 wherein said overlapped edges are pressed together to an initial contact pressure of at least about 0.01 $kg/cm^2$.

4. The process of claim 1 wherein at least one contacting surface of the overlapped edges has an appropriate functional coating thereon.

5. The process of claim 3 wherein said functional coating comprises at least one of long chain alkyl ketene dimer, polyamide-epichlorohydrin polymer, gelatin, carboxy methyl cellulose, alkyl carboxylic acid chrome complex, polyurethane, polyurea, silicone polyoxyethylene ether surfactant, polyethylene imine, melamine-formaldehyde resin, polyester latex, smoke tar, pigment, or dye particles.

6. The process of claim 4 wherein said functional coating is less than about 5.0 microns thick.

7. The process of claim 1 wherein an amount of zinc chloride in the range of from about 0.002 $g/cm^2$ to about 0.1 $g/cm^2$ is applied.

8. The process of claim 7 wherein an amount from about 0.002 $g/cm^2$ to about 0.02 $g/cm^2$ is applied.

9. The process of claim 1 wherein said overlap is from about 3% to about 20% of the circumference of the tube being formed.

10. The process of claim 1 wherein said cellulose containing material is selected from cellulose, regenerated cellulose, reinforced cellulose and reinforced regenerated cellulose.

11. The process of claim 2 wherein said seam is allowed to cure at least about 1.0 minutes prior to washing.

12. The process of claim 3 wherein said pressure is from about 0.05 $kg/cm^2$ to about 10 $kg/cm^2$.

13. The process of claim 1 wherein said zinc chloride is retained at said overlapped seam until after stuffing of the casing.

14. The process of claim 4 wherein only one contacting surface of the overlapped edges has a functional coating thereon.

15. The process of claim 4 wherein both contacting surfaces of the overlapped edges have a functional coating thereon.

16. The process of claim 3 wherein at least one contacting surface of the overlapped edges has an appropriate functional coating thereon having a thickness of up to about 5.0 microns.

17. The process of claim 16 wherein said zinc chloride is maintained at said overlapped seam for at least 24 hours.

18. In a process for seaming a cellulosic web wherein a cellulose containing film is overlapped and sealed by applying an aqueous zinc chloride solution between the overlapping film, the improvement comprising applying at least about 0.002 g of zinc chloride per $cm^2$ between said overlapping film, sealing said overlapping film, at a temperature of from about 0° C. to about 125° C., by pressing together said overlapping film and retaining at least about 0.002 $g/cm^2$ of zinc chloride at the overlapping seam.

19. The process of claim 18 wherein the seam is allowed to cure at least about 30 seconds after sealing prior to subjecting the seam to aqueous washing.

20. The process of claim 18 wherein said overlapped film is pressed together to an initial contact pressure of at least about 0.01 $kg/cm^2$.

21. The process of claim 18 wherein at least one contacting surface of the overlapped film has an appropriate functional coating thereon.

22. The process of claim 21 wherein said functional coating is less than about 5.0 microns thick.

23. The process of claim 18 wherein an amount of zinc chloride in the range of from about 0.002 $g/cm^2$ to about 0.1 $g/cm^2$ is applied.

24. The process of claim 18 wherein said cellulose containing material is selected from cellulose, regenerated cellulose, reinforced cellulose and reinforced regenerated cellulose.

* * * * *